(12) United States Patent
Suwa

(10) Patent No.: US 8,099,231 B1
(45) Date of Patent: Jan. 17, 2012

(54) SYSTEM AND METHOD FOR DETECTING FUEL INJECTOR MALFUNCTION BASED ON ENGINE VIBRATION

(75) Inventor: Yujiro Suwa, Commerce Township, MI (US)

(73) Assignee: GM Global Technology Operations LLC

( * ) Notice: Subject to any disclaimer, the term of this patent is extended or adjusted under 35 U.S.C. 154(b) by 0 days.

(21) Appl. No.: 12/858,693

(22) Filed: Aug. 18, 2010

(51) Int. Cl.
*G06F 19/00* (2011.01)

(52) U.S. Cl. .................. 701/111; 701/114; 123/406.21; 123/479

(58) Field of Classification Search .......... 701/103–105, 701/111–115; 123/299, 300, 406.21, 406.23, 123/406.24, 406.29, 445, 478–480, 483, 123/484
See application file for complete search history.

(56) References Cited

U.S. PATENT DOCUMENTS

| | | | | |
|---|---|---|---|---|
| 5,261,376 A * | 11/1993 | Kato et al. | ..................... | 123/479 |
| 6,173,691 B1 * | 1/2001 | Yanagihara | ................... | 123/299 |
| 6,968,825 B2 * | 11/2005 | Hitomi et al. | ............ | 123/406.11 |
| 7,681,552 B2 * | 3/2010 | Kaneko et al. | ........... | 123/406.29 |
| 7,945,379 B2 * | 5/2011 | Kaneko et al. | ................ | 701/111 |
| 2011/0146384 A1 * | 6/2011 | Kaneko et al. | ............... | 73/35.09 |

* cited by examiner

*Primary Examiner* — John Kwon

(57) ABSTRACT

A control system for an engine includes an injection control module, a processing module, and a malfunction detection module. The injection control module commands a fuel injector to operate in a split injection mode. The processing module that measures engine vibration during a period after commanding the split injection mode. The malfunction detection module detects a malfunction of the fuel injector based on a comparison between the measured engine vibration and expected engine vibration.

20 Claims, 3 Drawing Sheets

SYSTEM AND METHOD FOR DETECTING FUEL INJECTOR MALFUNCTION BASED ON ENGINE VIBRATION

CROSS-REFERENCE TO RELATED APPLICATIONS

This application is related to U.S. patent application Ser. No. 12/858,681 filed on Aug. 18, 2010. The disclosure of the above application is incorporated herein by reference in its entirety.

FIELD

The present disclosure relates to internal combustion engines and more particularly to a system and method for detecting a fuel injector malfunction based on engine vibration.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines draw air into an intake manifold through an inlet system that may be regulated by a throttle. The air in the intake manifold may be distributed to a plurality of cylinders and combined with fuel from fuel injectors to create an air/fuel (A/F) mixture. The A/F mixture may be combusted within the cylinders to drive pistons which rotatably turn a crankshaft generating drive torque. The drive torque may be transferred to a driveline (e.g., wheels) of a vehicle by a transmission.

The fuel injectors may operate in a plurality of modes. More specifically, the fuel injectors may operate in a normal fuel injection mode or a split fuel injection mode. The split fuel injection mode may include multiple (e.g., first and second) fuel injections during each combustion cycle. The first injection may be referred to as a "pilot injection" and may include a relatively small quantity of fuel. The pilot injection may increase a temperature within the cylinders thereby improving combustion of the subsequent second injection. The second fuel injection, on the other hand, may be referred to as a "main injection" and may include a relatively large quantity of fuel. In other words, the main injection may include a remainder of a desired quantity of fuel to be injected during the combustion cycle (e.g., main=desired−pilot).

SUMMARY

A control system for an engine includes an injection control module, a processing module, and a malfunction detection module. The injection control module commands a fuel injector to operate in a split injection mode. The processing module that measures engine vibration during a period after commanding the split injection mode. The malfunction detection module detects a malfunction of the fuel injector based on a comparison between the measured engine vibration and expected engine vibration.

A method for controlling an engine includes commanding a fuel injector to operate in a split injection mode, measuring engine vibration during a period after commanding the split injection mode, and detecting a malfunction of the fuel injector based on a comparison between the measured engine vibration and expected engine vibration.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
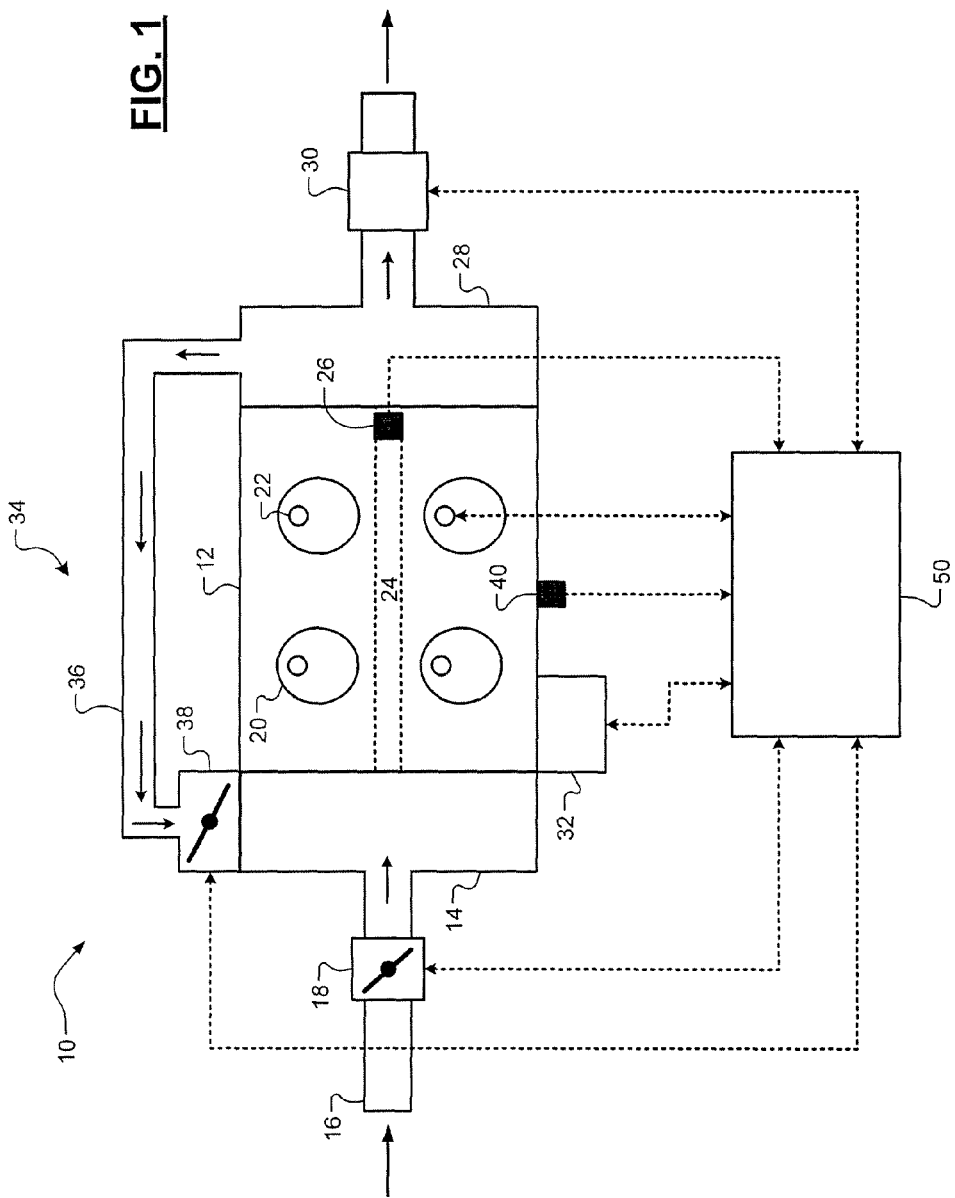
FIG. 1 is a functional block diagram of an exemplary engine system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Fuel injectors may operate in a plurality of modes. For example, the plurality of modes may include a "normal injection" mode and a "split injection" mode. The normal injection mode may include a single injection during each combustion cycle. The split injection mode, on the other hand, may include multiple (e.g., first and second) fuel injections during each combustion cycle. More specifically, the first injection may include the pilot injection and the second injection may include the main injection. For example, the normal injection mode may be used at higher engine speeds whereas the split injection mode may be used at lower engine speeds (e.g., where combustion is more difficult to control).

The fuel injectors may also operate in an incorrect injection mode, hereinafter referred to as a "malfunction" (e.g., normal injection instead of split injection). Specifically, the fuel injectors may malfunction due to clogs, leaks, corrosion, etc. For example, the flow through a fuel injector may be inhibited and thus multiple fuel injections (i.e., split fuel injection mode) may not be possible. Moreover, the malfunction of the fuel injectors may decrease fuel economy, decrease performance, increase emissions (e.g., nitrogen oxides, or NOx), increase noise/vibration/harshness (NVH) (e.g., due to more violent combustion), etc. Detecting fuel injector malfunctions, however, may be both difficult and costly (e.g., an open/closed circuit diagnostic).

Accordingly, a system and method are presented for detecting a fuel injector malfunction based on engine vibration. For example, the engine vibration may be determined or measured using an engine knock sensor, an accelerometer, or another suitable sensor. More specifically, the system and method may control a mode of the fuel injector and then determine whether the fuel injector is malfunctioning based on engine vibration. Therefore, the system and method may first command a predetermined injection mode (e.g., split injection mode) for the fuel injector.

The system and method may then determine an intensity of and a frequency of the engine vibration. The system and method may then compare the intensity and the frequency of the engine vibration to predetermined (i.e., expected) values. For example only, the system and method may also be implemented as an external diagnostic (e.g., a technician may switch fuel injection from normal injection to split injection and monitor engine vibration intensity and frequency).

The system and method may detect whether the fuel injector is malfunctioning based on the comparison. For example, the fuel injector may be malfunctioning when engine vibration intensity and/or frequency are less than the predetermined values. In other words, the split injection mode may have been commanded but the fuel injector may be malfunctioning. The system and method may also notify the driver (e.g., a malfunction indicator lamp, or MIL) and/or modify operation of the engine when a fuel injector malfunction is detected.

More specifically, the system and method may estimate or determine a parameter of the fuel injector and modify fuel injection based on the estimated or determined parameter. For example, the parameter may include a flow rate of the fuel injector based on a difference between the expected engine vibration and the measured engine vibration. The parameter, however, may also include a different parameter than flow rate.

Referring now to FIG. 1, an engine system 10 includes an engine 12. For example, the engine 12 may include a compression ignition (CI) engine (e.g., a diesel engine). The engine 12, however, may also include a different type of engine (e.g., a homogeneous charge compression ignition engine, or HCCI engine, or a spark ignition, or SI engine). The engine 12 draws air into an intake manifold 14 through an inlet system 16 that may be regulated by a throttle 18. A mass air flow (MAF) sensor (not shown) may measure a MAF rate into the intake manifold, which may also indicate an engine load.

The air in the intake manifold may be distributed to a plurality of cylinders 20. While four cylinders are shown, the engine 12 may include other numbers of cylinders. A plurality of fuel injectors 22 inject fuel into the cylinders 20 to create the A/F mixture. For example, the fuel injectors 22 may inject the fuel via intake ports of the cylinders 20, respectively (e.g., port fuel injection) or directly into the cylinders 20 (e.g., direct fuel injection). A plurality of spark plugs (not shown) may provide spark to combust of the A/F mixture (e.g., an HCCI engine or an SI engine).

The combustion of the A/F mixture drives pistons (not shown) which rotatably turn a crankshaft 24 generating drive torque. An engine speed sensor 26 may measure a rotational speed of the crankshaft 24 (e.g., in revolutions per minute, or RPM). The drive torque may be transferred to a driveline (e.g., wheels) of the vehicle via a transmission (not shown).

For example, the transmission (not shown) may be coupled to the crankshaft 24 via a torque converter (e.g., a fluid coupling).

Exhaust gas resulting from combustion may be expelled from the cylinders 20 into an exhaust manifold 28. An exhaust treatment system 30 may treat the exhaust gas to decrease emissions before releasing the exhaust gas into the atmosphere. Additionally, the exhaust gas may power a turbocharger 32. The turbocharger 32 may increase pressure (i.e., boost) of the air in the intake manifold, which may increase drive torque (e.g., when combined with more fuel). While a turbocharger 32 is shown, other types of forced-induction may be implemented (e.g., a supercharger).

The exhaust gas may also be introduced into the intake manifold 14 via an exhaust gas recirculation (EGR) system 34. The EGR system 34 may include an EGR line 36 that connects the exhaust manifold 28 to the intake manifold 14. The EGR system 34 may also include an EGR valve 38 that regulates an amount of exhaust gas introduced into the intake manifold 14 (e.g., a percentage of EGR).

An engine vibration sensor 40 may measure engine vibration. For example, the engine vibration sensor 40 may include an engine knock sensor, an accelerometer, or another suitable sensor. The engine vibration sensor 40 may measure vibration of the engine 12 due to combustion noise. In other words, the combustion noise may be based on changes in pressure inside the cylinders 20, changes in a ratio of the A/F mixture, and/or changes in combustion (e.g., fuel injection) timing. Additionally, the engine vibration sensor 40 may be a digital engine vibration sensor.

A control module 50 may receive signals from the throttle 18, the fuel injectors 22, the engine speed sensor 26, the exhaust treatment system 30, the turbocharger 32, the EGR valve 38, and/or the engine vibration sensor 40. The control module 50, however, may also receive signals from other engine components indicating various engine operating parameters (e.g., cylinder pressure). The control module 50 may control the throttle 18 (e.g., electronic throttle control, or ETC), the fuel injectors 22, the exhaust treatment system 30, the turbocharger 32, and/or the EGR valve 38. Additionally, the control module 50 may also implement the system or method of the present disclosure.

Figure 2:
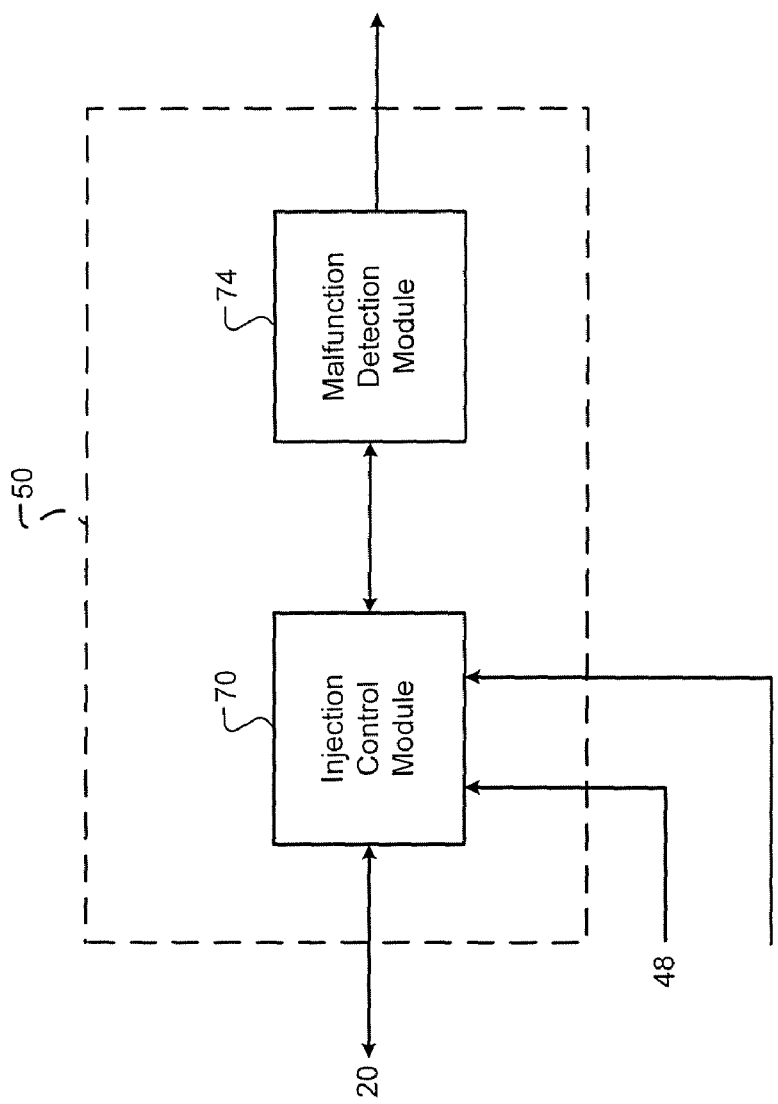
FIG. 2 is a functional block diagram of an exemplary control module according to the present disclosure.

Referring now to FIG. 2, the control module 50 is shown in more detail. The control module 50 may include an injection control module 70 and a malfunction detection module 74. The control module 50 may also include memory (not shown) that stores determined and predetermined parameters. For example, the memory (not shown) may include non-volatile memory (NVM).

The injection control module 70 communicates with the fuel injectors 22. For example, the injection control module 70 may generate control signals for the fuel injectors 22 to control parameters such as pulse-width and fuel injector mode. For example, the injection control module 70 may control the fuel injectors 22 based on engine load. The engine load may be represented by signal 72 and may be based on a mass air flow (MAF) rate into the engine 12 and/or driver input (e.g., an accelerator). The injection control module 70 also receives an engine vibration signal from the engine vibration sensor 40.

The injection control module 70 may control fuel injection based on combustion feedback (e.g., the engine vibration signal). The injection control module 70, however, may also process the engine vibration signal. More specifically, the injection control module 70 may perform digital signal processing (DSP) and generate a processed engine vibration signal. For example, the processed engine vibration signal may include a fast Fourier transform (FFT) of the engine vibration signal. The injection control module 70, however, may also process the engine vibration signal according to other suitable methods (e.g., filtering, smoothing, etc.).

The injection control module 70 may determine an intensity and a frequency of the engine vibration based on the engine vibration signal and the processed engine vibration signal, respectively. For example, the intensity of the engine vibration may be based on a maximum intensity of the engine vibration signal during a period. Additionally, for example, the frequency of the engine vibration may be based on a maximum of the processed engine vibration signal (e.g., FFT). While the injection control module 70 is shown to measure engine vibration and process the engine vibration signal, however, the control module 50 may also include an additional module such as "a processing module" (not shown) that performs these functions.

The malfunction detection module 74 receives the intensity and frequency of the engine vibration from the injection control module 70. The malfunction detection module 74 may detect a fuel injector malfunction based on the determined intensity and frequency of the engine vibration. More specifically, the malfunction detection module 74 may detect a malfunction when the determined intensity and frequency of the engine vibration are less than predetermined (i.e., expected) values, respectively. In other words, the malfunction detection module 74 may detect the malfunction because engine vibration increased less than expected, and thus the one or more fuel injectors 22 are malfunctioning.

The malfunction detection module 74 may then notify the driver of the vehicle when a malfunction is detected. For example, the malfunction detection module 74 may actuate a malfunction indicator lamp (MIL) to notify the driver that a malfunction occurred and service is required. Additionally or alternatively, the malfunction detection module 74 may communicate with the injection control module 70 to modify operation of the engine 12.

More specifically, the malfunction detection module 74 may estimate or determine a parameter of the fuel injector 22 and may then send the estimated or determined parameter of the fuel injector 22 to the injection control module 70. The injection control module 70 may then modify fuel injection based on the estimated or determined parameter. For example, the parameter may include a flow rate of the fuel injector 22. The parameter, however, may also include a different fuel injection parameter. The detected malfunction, the driver notification (e.g., MIL), and/or the estimated/determined parameter may be represented by signal 76.

Figure 3:
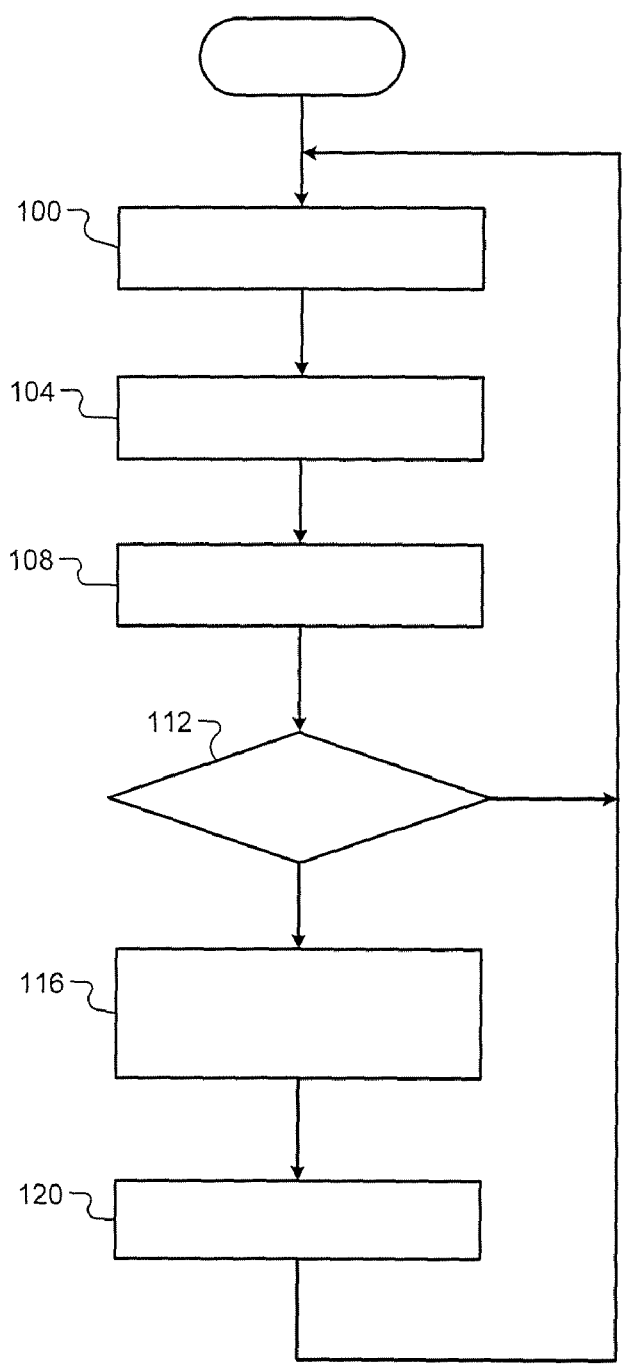
FIG. 3 is a flow diagram of an exemplary method for detecting a fuel injector malfunction based on engine vibration according to the present disclosure.

Referring now to FIG. 3, a method for detecting a fuel injector malfunction using the engine vibration sensor 40 begins at 100. At 100, the control module 50 may command the fuel injectors 22 to operate in a predetermined mode. For example, the control module 50 may command the fuel injectors 22 to operate in split injection mode (i.e., a transition from normal injection mode).

At 104, the control module 50 may measure engine vibration (e.g., using the engine vibration sensor 40). At 108, the control module 50 may determine an intensity and a frequency of the engine vibration. For example, the intensity may include a maximum of the engine vibration during a period and the frequency may include a maximum of a processed engine vibration signal (e.g., an FFT).

At 112, the control module 50 may compare the measured engine vibration (i.e., the determined intensity and frequency) to expected engine vibration. For example, the expected engine vibration may include a predetermined intensity and a predetermined frequency of engine vibration corresponding to a properly functioning fuel injector. If the measured engine vibration is less than the expected engine vibration, control may proceed to 116. Otherwise, control may return to 100.

At 116, the control module 50 may notify the driver of the vehicle of the fuel injector malfunction (e.g., via an MIL) and/or estimate or determine a parameter of the fuel injector 22 based on a difference between the expected engine vibration and the measured engine vibration. At 120, the control module 50 may adjust operation of the engine 12 based on the estimated or determined parameter. For example, the parameter may include a flow rate of the fuel injector 22 and the control module 50 may adjust fuel injection based on the estimated or determined flow rate. Control may then return to 100.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for an engine, comprising:
an injection control module that commands a fuel injector to operate in a split injection mode;
a processing module that measures engine vibration during a period after commanding the split injection mode; and
a malfunction detection module that detects a malfunction of the fuel injector based on a comparison between the measured engine vibration and expected engine vibration.

2. The control system of claim 1, wherein the split injection mode includes both a pilot injection and a main injection during each combustion cycle.

3. The control system of claim 1, wherein the malfunction detection module detects a malfunction of the fuel injector when the measured engine vibration is less than the expected engine vibration.

4. The control system of claim 1, wherein when the malfunction of the fuel injector is detected, the malfunction detection module at least one of generates an error signal and determines a parameter of the fuel injector.

5. The control system of claim 4, wherein the parameter of the fuel injector is one of an estimation and a determination of a flow rate of the fuel injector based on a difference between the expected engine vibration and the measured engine vibration.

6. The control system of claim 5, wherein the injection control module modifies fuel injection based on the estimated or determined flow rate.

7. The control system of claim 1, wherein the measured engine vibration is measured by an engine knock sensor or an accelerometer, and wherein the measured engine vibration has an intensity and a frequency.

8. The control system of claim 7, wherein the processing module determines the intensity based on a maximum of the measured engine vibration during a period.

9. The control system of claim 7, wherein the processing module determines the frequency based on a maximum of a fast Fourier transform (FFT) of the measured engine vibration.

10. The control system of claim 1, wherein the expected engine vibration is based on predetermined engine vibration associated with properly functioning fuel injectors.

11. A method for controlling an engine, comprising:
commanding a fuel injector to operate in a split injection mode;

measuring engine vibration during a period after commanding the split injection mode; and detecting a malfunction of the fuel injector based on a comparison between the measured engine vibration and expected engine vibration.

12. The method of claim 11, wherein the split injection mode includes both a pilot injection and a main injection during each combustion cycle.

13. The method of claim 11, wherein a malfunction of the fuel injector is detected when the measured engine vibration is less than the expected engine vibration.

14. The method of claim 11, further comprising:

when the malfunction of the fuel injector is detected, at least one of generating an error signal and determining a parameter of the fuel injector.

15. The method of claim 14, wherein the parameter of the fuel injector is one of an estimation and a determination of a flow rate of the fuel injector based on a difference between the expected engine vibration and the measured engine vibration.

16. The method of claim 15, further comprising modifying fuel injection based on the estimated or determined flow rate.

17. The method of claim 11, further comprising measuring engine vibration using an engine knock sensor or an accelerometer, wherein the measured engine vibration has an intensity and a frequency.

18. The method of claim 17, further comprising determining the intensity based on a maximum of the measured engine vibration during a period.

19. The method of claim 17, further comprising determining the frequency based on a maximum of a fast Fourier transform (FFT) of the measured engine vibration.

20. The method of claim 11, wherein the expected engine vibration is based on predetermined engine vibration associated with properly functioning fuel injectors.

\* \* \* \* \*